Feb. 15, 1966  B. L. DOSKOCIL  3,234,908
CONVERTIBLE ANIMAL CRATE
Filed Dec. 19, 1963  2 Sheets-Sheet 1
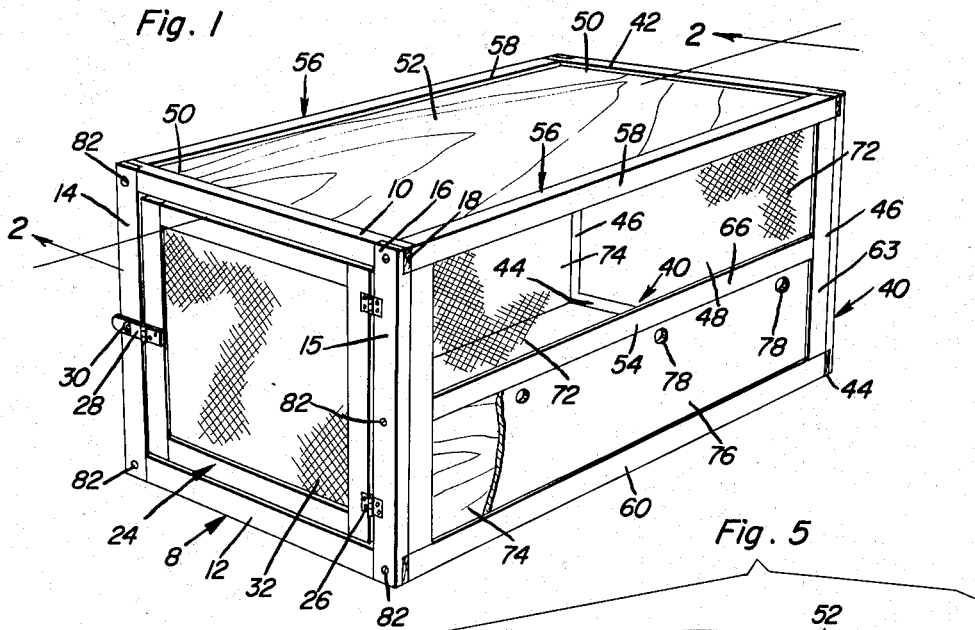
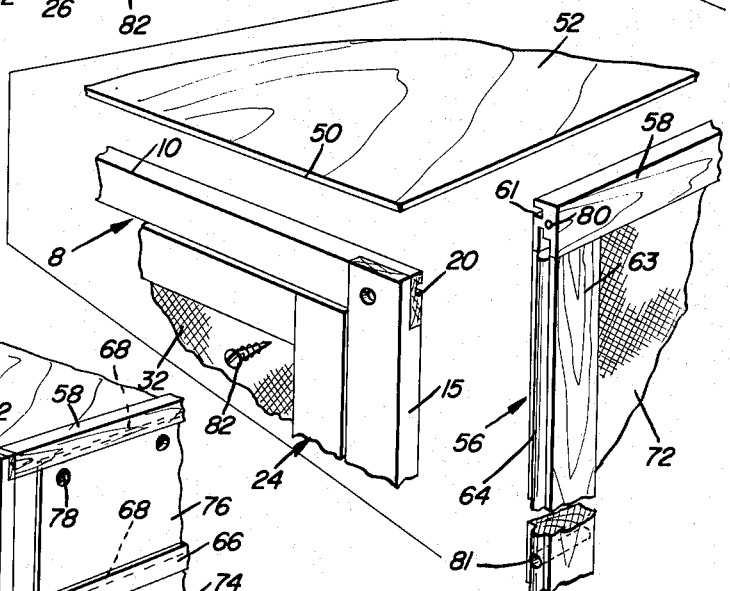
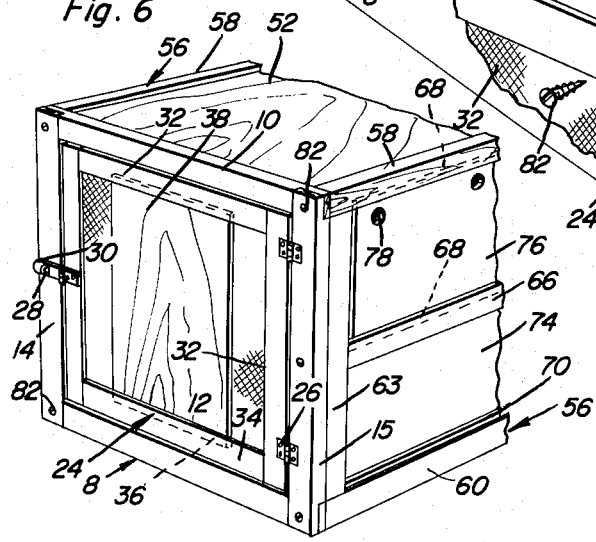
Benjamin L. Doskocil
INVENTOR.

Feb. 15, 1966  B. L. DOSKOCIL  3,234,908
CONVERTIBLE ANIMAL CRATE
Filed Dec. 19, 1963  2 Sheets-Sheet 2
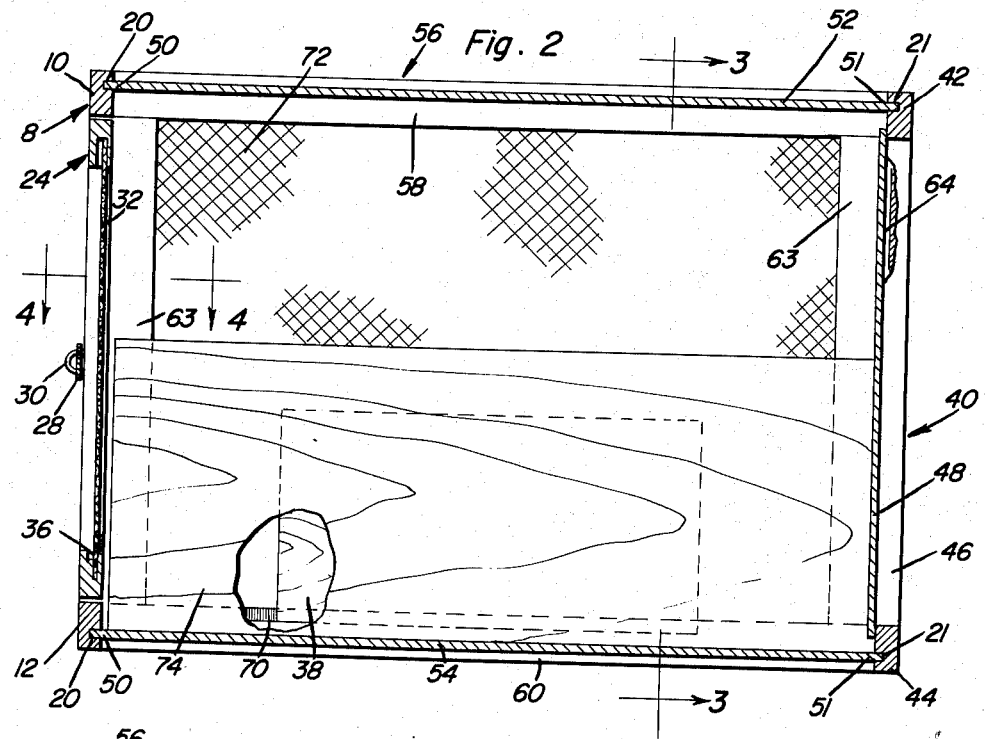
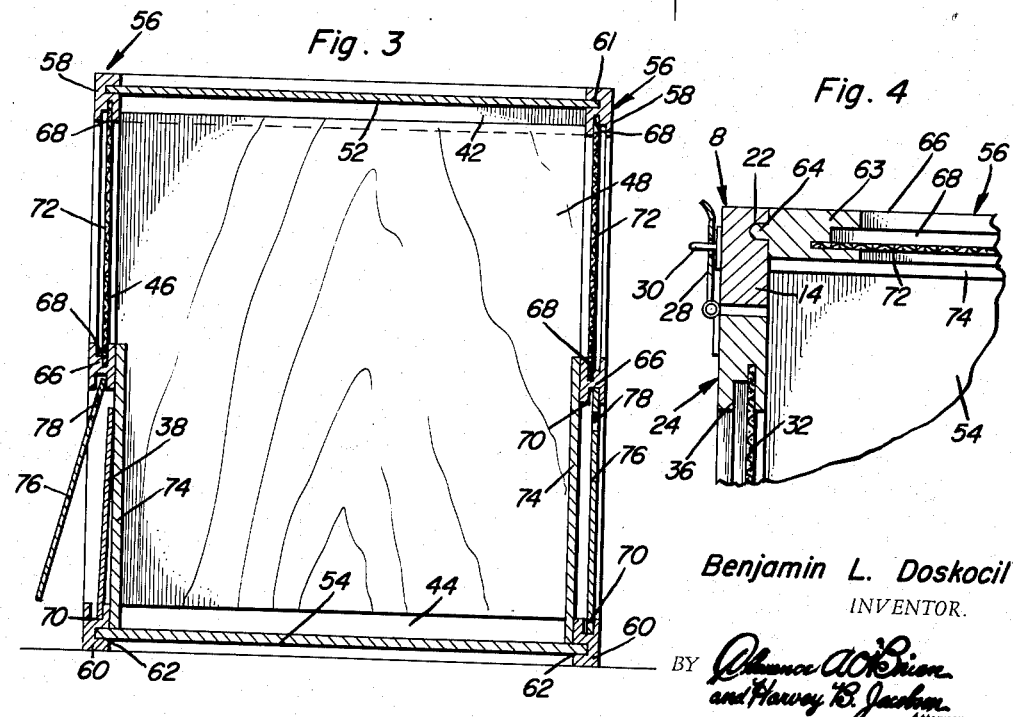
Benjamin L. Doskocil
INVENTOR.

United States Patent Office 3,234,908
Patented Feb. 15, 1966

3,234,908
CONVERTIBLE ANIMAL CRATE
Benjamin L. Doskocil, Rte. 2, Box 485, Arlington, Tex.
Filed Dec. 19, 1963, Ser. No. 331,838
5 Claims. (Cl. 119—19)

The present invention relates to an improved portable knockdown carrying and shipping crate for pet animals (cats, dogs and other household pets) which is a practical and desirable contribution to the art in that it features a construction which assures quick and easy assembling of prefabricated parts and weather control means.

Persons conversant with the field of invention herein under advisement and who are likewise familiar with significant handling problems are aware that freight charges, which involve storage and other situations continue to reveal the need for a simple, economical commercially feasible pet confining and handling box or crate. To the ends desired the invention hereinafter disclosed satisfies the requirements for an acceptable knockdown crate. It follows that the crate, as illustrated in the drawings, meets this condition in that it embodies prefabricated ready-to-assemble top, bottom, side and front and rear end walls which are such that they can be brought together in crate relationship quickly and without trying the patience of the person who is called upon to take care of the assembling task. Each crate (there being four sizes) comes individually packaged in an appropriate protective carton with instructions, and screws for handling the assembling job. Experience has shown that the ready-to-use crate can be put together with a minimum amount of time and knowledge requiring only some twelve more or less fastening screws.

It is also a matter of common knowledge in connection with pets and crating and handling that weather control means is highly desirable. In fact, pets need protection in cold damp weather. During shipping, handling and showing, animals encounter quick changes in climate and temperatures. This poses a need for a crate that can be converted to meet the ever-changing weather conditions. As will be hereinafter more clearly appreciated the instant crate enables the user to cope with the ever-present problem of changeable weather. Accordingly, and whatever the season, the improved crate can be converted to aptly serve the all-weather purposes for which it is intended.

In carrying out a preferred embodiment of the invention the top, bottom and one end wall is made from a rigid imperforate white pine or equivalent wooden (perhaps even plastic) panel. The side walls are of special construction as will be later set forth. The front wall is provided with a hinged screen door. The door frame is such as to accommodate an attachable and detachable wooden weather-guard panel.

This attachable and detachable door panel when it is not being used can be and preferably is stored in a storage space provided therefor on at least one longitudinal side wall of the crate. In other words it can be stored away when not in use and brought into play whenever necessary or desired.

The longitudinal side walls are also unique in construction. To achieve what is desired each lengthwise side wall has its lower half-portion covered by imperforate wooden or equivalent fixed panels. This fixed panel in conjunction with the accompanying marginal frame members provides for storage of an attachable and detachable side wall panel. The latter is normally in its stored out-of-the-way position. When, however, the weather so requires it is removed from its place of storage and is shifted to the top half of the side wall which top half is provided with a permanent ventilating screen. Thus the screen can be employed without obstruction when the weather calls for its use or, it can be covered over by applying the applicable and removable wooden or equivalent imperforate panel.

By reason of the fact that the improved crate lends itself to use depending on whether ventilating screens or blocking panels are to be used (summer, fall, spring, winter) it will be evident that the crate is not only helpful during shipping but at other times when the animal must be confined as at dog shows and so on.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in perspective of a ready-to-use pet animal crate constructed in accordance with the invention and with the upper side screens and front door screen fully exposed and in use for good climate conditions;

FIGURE 2 is a view on a larger scale taken approximately on the plane of the central longitudinal section line 2—2 of FIGURE 1;

FIGURE 3 is a cross-section on the vertical section line 3—3 of FIGURE 2;

FIGURE 4 is an enlarged fragmentary detail section on the section line 4—4 of FIGURE 2;

FIGURE 5 is an exploded perspective view illustrating certain of the principal component parts; and FIGURE 6 is a view in perspective showing the forward or lefthand end of the structure depicted in FIGURE 1 with the door panel and screen covering side panel in position to cope with cold or damp weather as the case may be.

With reference to FIGS. 1 and 6 and starting with the lefthand or front end wall it will be seen that this wall comprises a prefabricated frame 8 made up of a horizontal top frame member 10, a coplanar similar bottom frame member 12 and vertical frame members 14 and 15. The coacting corner end portions of the respective frame members as denoted at 16 and 18 are overlapped to provide the desired joint. The upper and lower frame members 10 and 12 are provided on an interior side with assembling grooves 20. Also and as is shown, for example, in FIG. 4, the interior side or surface of each upright frame member 14 or 15 is provided with a groove 22 which will be referred to later. These four grooved frame members serve to accommodate and support a prefabricated screen door 24 which is hinged in place on the frame member 15 as denoted at 26. On the other side there is a hinged hasp 28 and a stable 30 to accommodate a padlock (not shown). This door is provided with a suitable screen 32 and the door frame members 34 at the top and bottom are provided with suitable grooves 36 (FIG. 4). These grooves 36 serve to accommodate an optionally usable attachable and detachable weather panel 38 which is installed in the manner illustrated in FIG. 6 and which, when it is not being used, is stored away in a pocket or compartment provided therefor at the left as shown in FIG. 3 and as will be hereinafter referred to with greater particularity. The construction and purpose of the front door-equipped frame 8 should now be clear. The opposite end frame, speaking broadly, is similar in construction and denoted generally by the numeral 40. To the ends desired it comprises a rectangular frame embodying top and bottom frame members 42 and 44 (FIG. 2) and interconnecting vertical frame members 46. An imperforate rear panel 48 is provided. This panel is supported by the rear end frame. To this end the marginal edges of the panel 48 are superimposed on and suitably secured to the frame members 42, 44 and 46. The vertical frame members 46 are provided on forward sides or faces with grooves (not detailed) which correspond with the aforementioned grooves 22 (FIG. 4). As is evident (FIG. 2) the horizontal top and bottom frame members 10 and 12 at the left and frame members 42 and 44 at the right are provided with grooves to accommodate the forward marginal portions 50 of an imperforate top wall or panel 52 and a similar imperforate complemental bottom wall or panel 54. More particularly, the grooves 20 serve to accommodate the edges 50 while similar grooves 21 serve to accommodate the rearward transverse marginal edges 51 of the top and bottom panels 52 and 54 respectively.

The lengthwise or marginal edge portions of these panels are accommodated in similar grooves provided in frame members of the respective longitudinal frames, that is, the lengthwise frames which are interposed between and connected with the front and rear frames. These side wall frames are each the same in construction and it is believed that it will simplify matters to merely describe one side frame or wall. To this end the frame as a unit is denoted by the numeral 56. It comprises a horizontal top frame member 58, a similar lower frame member 60, these frame members being provided on interior sides with grooves 61 and 62 which receive the marginal edge portions of the aforementioned top and bottom panels or walls 52 and 54 as is evident from the views of the drawing. Each frame also includes at the ends of a vertical frame member 63 which is provided along an edge thereof with a conventional tongue 64 which is fitted into the groove provided therefor, for example, the groove 22 (FIG. 4) and suitably retained (by glueing for example) in place. Each side frame also includes a centrally horizontally disposed divider rail 66 which rail as shown in FIG. 3 is provided with upper and lower lengthwise grooves. The upper grooves are denoted at 68 and the lower grooves at 70. These rails 66 in conjunction with the top frame member 58 and end frame members 63 serve to accommodate a permanently attached ventilating screen 72. The rails 66 and the lower frame members 60 and also the end frame members 63 serve to accommodate a permanently attached interior rigid imperforate panel 74 which obviously closes the lower half-portion of each side wall in the manner illustrated. It follows that each lengthwise side wall has a lower permanently closed half-portion and an upper screened half-portion. In order to convert and thus cope with changing weather conditions additional rectangular wooden or equivalent panels are provided as at 76. These panels are normally retained in an out-of-the-way position parallel to the panels 74, and are seated in the channels or grooves 70. When one desires either panel 76 can be removed (as illustrated at the left) by moving it upward, outward and downwardly, bodily removing it, and then fitting it into the grooves 68. It is then on the exterior of the screen and serves to substantially span and close the screen 72.

Normally it will be evident that the screen 32 of the screen door is uncovered, as are the top screens 72. When conditions require the two panels 76 are removed from their storage grooves and are shifted to and fitted into the grooves 68 thus assuming the position illustrated in part in FIG. 6. If desired these shiftable or convertible panels 76 are provided with vent holes 78.

It will be evident that by placing the side walls in their respective grooves in the rear frame and then inserting the top and bottom walls into the proper grooves in the side frames the rear marginal edge of the top and bottom walls will align in their respective grooves in the rear frame. Finally the forward tongues of the two side walls and the forward marginal edges of the top and bottom walls are aligned into their respective grooves provided in the front frame allowing for quick easy assembly.

By prefabricating the individual frames which make up the two end walls and by providing the tongue and groove joints it will be seen that the individual parts can be readily assembled from a compact knockdown state and thus brought into play to provide the ready-to-use crate. Of course, the crate can be dismantled at a later date by removing the screws in what is believed to be a substantially obvious manner.

It is perhaps necessary to again mention that the front door panel 38 when it is not in use as shown in FIG. 6 can be placed in the stored away position shown at the left in FIG. 3. It follows, therefore, that the construction is one wherein several panels, a front door panel and two sides wall panels are stored away in the frame structures when not in use and are brought into play in the manner illustrated in FIG. 6 whenever it is desired to use the same.

It is submitted that a careful consideration of the specification in conjunction with the views of the drawing will enable the reader to obtain a clear and comprehensive understanding of the component parts, the manner in which they are constructed, assembled and served. The features and advantages are likewise believed to be evident. Accordingly, a more extended description is regarded as unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A portable knockdown all-weather shipping, carrying and protecting crate for cats, dogs and similar household pets comprising an imperforate top wall, an opposed imperforate bottom wall providing a floor, opposed lengthwise side walls, and front and rear end walls, said rear end wall being rigid and imperforate, said front wall provided with door means, each side wall having longitudinal upper and lower half-portions, said upper half-portion being provided with and wholly spanned by a fixed insect repelling and ventilating screen, said lower half-portion being provided with and wholly spanned and covered by a first imperforate panel, said panel being fixedly mounted in a plane inwardly of the plane of said screen.

2. The invention defined in claim 1, and wherein said lower half-portion is provided with a second panel opposed to the first panel, said first panel being permanently fixed in its intended place, the second panel being readily applicable and removable and being shiftable from its normal lower position to an upper position opposite and outwardly of the screen and then covering the screen when prevailing weather conditions call for such coverage.

3. An animal confining and handling container comprising a generally rectangular box-like crate, said crate comprising: a front end frame provided with a hingedly mounted screen door, said door provided with an optionally usable attachable and detachable panel, a rear end frame, said end frame having a permanently embodied imperforate panel, a pair of opposed like side frames interposed between the end frames and aligned therewith, all of said frames having frame members provided with grooves, top and bottom wall panels having marginal edges fitted in grooves provided therefor in the frame members provided therefor, each side frame having a lengthwise divider rail, said rail and a lower part of the side frame having an interior permanently attached panel whereby the lower half-portion of said side frame is closed, the upper half-portion of said side frame being spanned by a screen.

4. An animal confining and handling container comprising a generally rectangular box-like crate, said crate comprising: a front end frame provided with a hingedly mounted screen door, said door provided with an optionally usable attachable and detachable panel, a rear end frame, said rear end frame having a permanently embodied imperforate panel, a pair of opposed like side frames interposed between the end frames and aligned therewith, all of said frames having frame members provided with grooves, top and bottom wall panels having marginal edges fitted in grooves in the frame members provided therefor, said side frames in each instance having a lengthwise divider rail, said rail and a lower part of the side frame having an interior permanently attached panel whereby the lower half-portion of said side frame is closed, the upper half portion of said side frame being spanned by a screen, said divider rail being provided along the top and bottom edges with grooves and said top and bottom frame members being likewise provided with grooves, said grooves adapted to receive a bodily applicable and removable imperforate weather panel, and a panel normally seated in the grooves in the lower half-portion of the side frame opposed to and spaced from the adjacent permanent panel.

5. An animal confining and handling container comprising a generally rectangular box-like crate, said crate comprising: a front end frame provided with a hingedly mounted screen door, a rear end frame, said end frame having a permanently embodied imperforate panel, a pair of opposed like side frames interposed between the front and rear end frames and aligned therewith, all of said frames having frame members provided with grooves, top and bottom wall panels having marginal edges fitted in grooves in the frame members provided therefor, said side frames in each instance having a lengthwise divider rail, said rail and a lower part of the side frame having an interior permanently attached panel whereby the lower half-portion of said side panel is closed, the upper half portion of said side panel being spanned by a screen, said divider rail being provided along the top and bottom edges with grooves and said top and bottom frame members being likewise provided with grooves, said grooves adapted to receive a bodily applicable and removable imperforate weather panel, and a panel normally seated in the grooves in the lower half-portion of the side frame opposed to and spaced from the adjacent permanent panel.

References Cited by the Examiner
UNITED STATES PATENTS

| | | | |
|---|---|---|---|
| 505,213 | 8/1893 | Barry | 217—63 |
| 571,592 | 11/1896 | Hazen | 119—19 |
| 807,196 | 12/1905 | O'Brien | 119—19 |
| 1,040,489 | 10/1912 | Baker | 119—19 |
| 1,671,051 | 5/1928 | Soderquist | 220—6 |
| 2,678,628 | 5/1954 | Williams | 119—19 |
| 2,759,622 | 8/1956 | Simmons et al. | 220—4 |
| 3,116,847 | 1/1964 | Collins | 217—12 |
| 3,144,852 | 8/1964 | Messeas | 119—19 |

SAMUEL KOREN, *Primary Examiner.*
ALDRICH F. MEDBERY, *Examiner.*